(12) United States Patent
Ertl

(10) Patent No.: US 8,235,169 B2
(45) Date of Patent: Aug. 7, 2012

(54) NOISE-REDUCING DEVICE AND METHOD FOR REDUCING NOISE

(75) Inventor: Michael Ertl, Neunkirchen am Sand (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/059,472

(22) PCT Filed: Aug. 19, 2008

(86) PCT No.: PCT/EP2008/006917
§ 371 (c)(1),
(2), (4) Date: Feb. 17, 2011

(87) PCT Pub. No.: WO2010/020268
PCT Pub. Date: Feb. 25, 2010

(65) Prior Publication Data
US 2011/0147115 A1    Jun. 23, 2011

(51) Int. Cl.
*H02K 1/26* (2006.01)
(52) U.S. Cl. .................. 181/202; 181/198; 181/199
(58) Field of Classification Search .................. 181/202, 181/198, 199; 52/144, 145
See application file for complete search history.

(56) References Cited

U.S. PATENT DOCUMENTS

| | | | | |
|---|---|---|---|---|
| 4,167,598 A * | 9/1979 | Logan et al. | ................. | 428/34.1 |
| 4,909,003 A * | 3/1990 | Hennigan | ........................ | 52/144 |
| 5,241,512 A * | 8/1993 | Argy et al. | ........................ | 367/1 |
| 5,710,396 A * | 1/1998 | Rogers | ........................... | 181/208 |
| 5,719,359 A * | 2/1998 | Wolf et al. | ..................... | 181/286 |
| 7,717,228 B2 * | 5/2010 | Boock | ........................... | 181/208 |
| 2006/0185931 A1 * | 8/2006 | Kawar | ........................... | 181/202 |

FOREIGN PATENT DOCUMENTS

| | | |
|---|---|---|
| DE | 19834379 A1 | 2/2000 |
| DE | 10338307 A1 | 3/2005 |
| DE | 102005045844 B3 | 2/2007 |
| FR | 2630175 A1 | 10/1989 |
| GB | 2172966 A | 10/1986 |
| GB | 2443014 A | 4/2008 |
| JP | 4362499 A | 12/1992 |

* cited by examiner

*Primary Examiner* — Forrest M Phillips
(74) *Attorney, Agent, or Firm* — Laurence A. Greenberg; Werner H. Stemer; Ralph E. Locher

(57) ABSTRACT

A device has at least one region to be damped for the purpose of noise reduction. The at least one region may, in particular, be a wall region, for instance of an electrical device housing, and it is covered at least partially by at least one vacuum panel. In the noise reduction method, a vacuum panel is pulled by vacuum pressure against the region to be damped, so that a hollow space under vacuum pressure is formed between the vacuum panel and a housing.

15 Claims, 4 Drawing Sheets

NOISE-REDUCING DEVICE AND METHOD FOR REDUCING NOISE

BACKGROUND OF THE INVENTION

Field of the Invention

The invention relates to a device with at least one sound-damping region and a method for reducing noise.

Areal plate structures in mechanical or electrical installations are excited so as to perform bending oscillations by direct or indirect vibratory excitation (force input, sound conduction), said bending oscillations having a considerable surface vibration and associated undesirable sound emission, in particular in the case of the excitation of natural oscillations. In order to increase the static and/or dynamic load capacity, such flat plate structures are often reinforced by ribs or beads. If these reinforcements are positioned in plate regions in which oscillation maxima (oscillation anti-nodes) occur in the case of the unreinforced plate, the associated local increase in the flexural strength brings about a considerable local reduction in the vibration amplitude and sound emission as well as an unaltered natural oscillation response of the entire plate structure. The maxima of the bending deflection and the sound emission are localized in the reinforced plate structure in the centers of the individual plate subareas between the reinforcements.

An unreinforced or reinforced thin-walled plate structure represents an oscillatory system. The forces of inertia in the plate interior result in longitudinal, dilatation, shear and bending waves. In the case of thin-walled plate structures (in which an extent of the plate perpendicular to the plane is substantially less than in the plane) and/or in the case of vibration excitation perpendicular to the plate surface, only bending waves occur which are relevant for the sound emission. Characteristic of the bending oscillations of the plate structure to be damped are the location and time-dependent amplitude (deflection) and the vibration velocity. A fluid (gas or liquid) surrounding the plate subject to bending oscillations is thus excited so as to perform longitudinal oscillations, which are perceived as undesired sound in the acoustic frequency range. The level of sound emission is primarily dependent on the size of the vibrating area, the vibration velocity in the normal direction to the surface and the physical distribution of the vibration amplitudes and the vibration phase angle.

A reduction in the noise emission has until now been brought about by passive or active measures. Known passive measures are:

(1) Detuning of the plate structure (for example tank structure) which is subject to bending oscillations, for example by means of attaching additional masses for frequency shifting in order to avoid the excitation of natural modes, or by attaching reinforcing elements (ribs, beads, double wall, sandwich structures). This measure has the disadvantage of a considerable increase in the total mass and of a negative effect on the aesthetics of the surface.

(2) Enclosing the vibrating plate/tank structure in a housing. In this case, disadvantages include high costs and a high space requirement. Often, sound-effective, complete enclosure is also not possible (feed lines, access openings). In addition, necessary transport of waste heat often prevents complete enclosure.

(3) Attaching acoustic insulating plates with a high level of acoustic damping, for example by virtue of porous absorbers, insulating wool, sandwich structures with layers having high damping and sound-reflecting characteristics. In this case, disadvantageously, there is a low level of sound-insulating effectiveness in rigidity-specific and mass-specific frequency ranges of plate oscillations.

(4) Reducing the vibration swell rate or the introduction of sound thereof by a reduction in the oscillation-exciting forces (for example in the case of transformers by means of a reduction in the magnetic induction) or by reducing the machine or transmission power. However, this is a very cost-intensive solution which severely reduces the customer benefit.

Known active measures are:

(5) Active vibration and noise cancellation by regulated active application of force to the vibrating plates by means of piezoelectric, electromagnetic or magnetostrictive actuators and (6) Active noise cancellation by noise compensation.

S. Langer, "Schalltransmission durch Isolierverglasung" [Sound transmission through insulating glazing], dissertation, Braunschweiger Schriften zur Mechanik No. 41, Braunschweig, 2001, describes an FEM/REM calculation model for sound wave propagation and the passage of sound through multiply glazed windows and dynamic interaction processes. In this case, the window panes which, owing to changes in sound pressure in the ambient air, experience bending oscillations and are modeled as Kirchhoff plates, are treated in the same way as the gas-filled interspace between the panes and the sealed-off, air-filled spaces in the building with the FEM. Here, use is made of the fact that sound requires a medium for propagation. As the gas pressure in the cavity decreases, the density of the air changes. Thereupon, a change in the sound velocity is to be expected $$c = \sqrt{\frac{\kappa p}{\rho}},$$

where ρ denotes the gas density, p denotes the gas pressure and κ denotes the isentrope coefficient. Although the isentrope coefficient is a function of temperature and gas pressure, when a simplifying assumption of an ideal gas is made, the pressure dependence can be disregarded. A change in the gas pressure in the air filling of the cavity therefore only results in a change in the gas density. The sound velocity remains unchanged if it is assumed that there is a loss-free sound propagation in the air. The passage of sound in turn is dependent on the ratio of the acoustic impedance of the two media. The insulating window has a frequency-dependent degree of sound insulation, depending on the geometric dimensions, the material properties of the panes of glass and the sound properties of the gas in the cavity which is subjected to a negative pressure (compression module, density and resultant sound velocity). A typical profile for sound insulation curves for a cavity filled with air under standard conditions and with negative pressure conditions is in principle the same, but the level of sound insulation differs considerably. In particular, a relatively low pressure in the cavity reduces the coupling between the panes of glass. The use of composite glass is also described, as a result of which a further reduction in the passage of sound is formed. In particular, the damping character of additional absorber materials results in a substantially smoother frequency profile of the sound insulation curves, i.e. a severe trough in the insulation curve at certain frequencies is reduced. According to C. Filthaut "Schwingungsdämpfung mittels Verbundblechen aus Stahl and Kunststoff" [Oscillation damping by means of composite sheets of steel and plastic]; Haus der Technnik (Veranst.), Essen, 1999, the damping effect of such composite sheets consists in that pulsating deformations are forced upon the interlayer in the event of bending oscillations, as a result of which oscillation energy is absorbed there on account of internal friction.

According to A. Meier "Die Bedeutung des Verlustfaktors bei der Bestimmung der Schalldämmung im Prüfstand" [The significance of the loss factor in the determination of sound damping in the test state]; dissertation; Shaker, Aachen 2000, the degree of sound damping of single walls is, in accordance with the experimentally determined Berger's law of masses $$R(\theta) = 10\log\left[1 + \left(\frac{\omega \cdot m''}{2\rho_0 \cdot c_0}\cos\theta\right)^2\right] dB,$$

where $m''$ denotes the mass per unit area of the plate and $\omega=2\pi f$ denotes the angular frequency of the sound wave which is incident at the angle $\theta$ with respect to the plate normal.

The object of the present invention is to provide an inexpensive way, which can be implemented relatively easily, of reducing a sound emission, in particular through plate regions subject to bending oscillations.

BRIEF SUMMARY OF THE INVENTION

This object is achieved by means of a device and a method according to the respective independent claim. Preferred embodiments can be gleaned in particular from the dependent claims.

The device has at least one region to be damped, which is covered at least partially by at least one vacuum panel. In this case, owing to the nature of the covering by means of a vacuum panel, said vacuum panel is spaced apart from the region to be damped, with the result that at least one cavity, to which a negative pressure can be applied, is formed between the region to be damped and the vacuum panel. For this purpose, the cavity is connected, possibly via further cavities, to a negative pressure or vacuum means, for example a vacuum pump, which produces and maintains the negative pressure during normal operation.

Through the cavity to which a negative pressure is applied during normal operation, a noise emission is effectively achieved by means of a reduction in the sound emission purely on the basis of a reduction in the passage of sound through the cavity between the housing and the vacuum panel. With the density in the cavity reduced as a result of the vacuum, the acoustic impedance is reduced, and the sound transmission is effectively reduced at the two transitions between solid body and vacuum. This results in a reduction in the surface vibration rate and therefore in the degree of structure-borne noise and the degree of emission of the surface of the vacuum panel which emits into the surrounding environment in comparison with a region which is not equipped with vacuum panels.

Preferably, the at least one vacuum panel is fastened on a low-vibration region of the device in order to keep transmission of oscillations between the device and the vacuum panel via the mechanical contact therebetween low. A low-vibration region is understood to mean a region in which only low vibration amplitudes (with no more than 20%, preferably no more than 10% of the maximum amplitude) prevail in comparison with other regions, in particular local oscillation minima. The vacuum panel is preferably attached approximately in punctiform and/or linear fashion.

In addition, a device is preferred in which the at least one vacuum panel is fastened to the device during normal operation as a result of the negative pressure in the cavity. As a result, the conduction of structure-borne noise from the device to a panel is damped, in particular in comparison with a permanently fixed physical connection.

In order to ensure sufficient vacuum strength and further oscillation decoupling between the housing and the vacuum panel, it is preferred if the vacuum panel rests on the housing via an elastic plastic seal. It is particularly preferred if the plastic seal is in the form of an O ring, in particular a sealing-edge O ring. In order to increase the vacuum strength, a silicone-sealed plastic seal is preferred.

A device is also preferred in which the regions which are covered by the at least one vacuum panel or are delimited by the cavity have, at least partially, a plate-like and/or shell-like design and are preferably not reinforced by reinforcing elements. The regions to be damped can generally have reinforcing elements (ribs, beads, etc.) or dispense with said elements. In other words, the vacuum panel can also cover reinforcing elements, or said reinforcing elements are delimited by a cavity.

It is further preferred if the region to be damped has a wall, in particular an outer wall, of the device.

The at least one vacuum panel is then fitted preferably at least partially close to at least one reinforcing element, in particular a reinforcing element which adjoins the region to be damped. Since reinforcing elements (for example a rib or a bead) are in any case often provided in order to achieve sufficient rigidity of the device, with relatively low oscillation amplitudes occurring in the vicinity of said reinforcing elements, it is advantageous for vacuum panels to be attached there owing to the fact that the additional structural complexity is only low. If no express reference is given to the contrary, the text which follows will describe the device with reference to covered, plate-shaped wall regions, which should be understood to mean both planar and curved thin regions (shell regions).

In order to prevent the vacuum panels from falling off in the event of a loss of negative pressure, a device is preferred which also has at least one negative pressure drop securing means for mechanically fixing at least one of the vacuum panels in the event of a lack of negative pressure between the at least one of the vacuum panels and the device. This may be, for example, a simple projection, which reaches over the vacuum panel on the side opposite the device. In order that it is not necessary for the vacuum panels to be pressed against the device at the beginning of normal operation, it is preferred if the vacuum panel is held on the device by the negative pressure drop securing means in such a way that a cavity is formed which is dense enough for the vacuum panel to be attached by suction.

For further noise insulation, it is preferred if at least one cavity between the device and the at least one vacuum panel is filled at least partially with at least one sound-absorbing material, for example insulation wool and/or porous absorbers.

For yet further noise insulation, it is preferred if the vacuum panel has a multilayered design (composite panel).

It could thus be preferred if the vacuum panel has merely a two-layered design, wherein one panel layer is configured as the absorber layer, in particular damping plastic layer. The other panel layer ("support layer") can in particular determine the mechanical properties (oscillation characteristics, strength etc.) and is advantageously constructed on metal (steel, aluminum, alloys thereof etc.), plastic, ceramic or a composite thereof.

However, the vacuum panel can also have a support layer, to both sides of which in each case one absorber layer, in particular damping plastic layer, is applied, which results in a three-layered composite sheet.

In addition, it may be preferred if the vacuum panel has at least two, in particular metallic, support layers with an absorber layer introduced therebetween, in particular a plastic layer, especially a viscoelastic plastic layer.

Owing to the use of a sound absorber layer, a further reduction in the passage of sound is achieved. In particular, the damping character of additional absorber materials results in a substantially smoother frequency profile of the sound insulation curves, i.e. a trough in the insulation curves at certain frequencies can be reduced.

Alternatively or in addition, however, it may also be preferred if a cavity, to which a negative pressure can be applied, is provided between at least two layers of the vacuum panel, at least during normal operation.

These composite arrangements can generally be generalized to more than three layers.

It is possible for vacuum panels to be arranged on the device, in particular the wall of the device, on the outside, on the inside or on both sides (on the inside and outside).

The vacuum panel (including the oscillatory fastening and vacuum seal) is preferably dimensioned such that it does not form any dominant natural modes or resonant frequencies in the frequency range to be damped.

It is also preferred if the thickness of the vacuum panel (sound insulation panel) and the distance thereof from the region to be damped are designed such that a bend in the vacuum panel which would result in contact with the region to be damped is avoided.

For sound damping, it is also preferred if the mass of the vacuum panels is a great deal lower than the mass of the areally associated region, in particular wall region, especially plate-like region, to be damped.

The device is preferably in the form of a housing.

Preferably, the housing is designed to accommodate an electrical or mechanical device, in particular to accommodate a transformer, specifically an oil-filled transformer, or a motor, for example an electrical generator.

In the method for noise reduction, a vacuum panel is attached to a device by suction by virtue of a negative pressure, with the result that a cavity to which a negative pressure is applied is formed between the vacuum panel and the region to be damped.

Taking into consideration the excitation and emission mechanisms, a considerable noise reduction can be achieved, in particular as a result of a reinforced plate structure being subdivided into force-carrying reinforcements (ribs/webs, beads, etc.) and sound-decoupled cladding panels.

In the following figures, the invention will be described schematically in more detail using exemplary embodiments, in which the device is configured as a housing, merely for illustrative purposes. Here, identical or functionally identical elements can be provided with the same reference symbols for improved clarity.

DESCRIPTION OF THE INVENTION

Figure 1A:
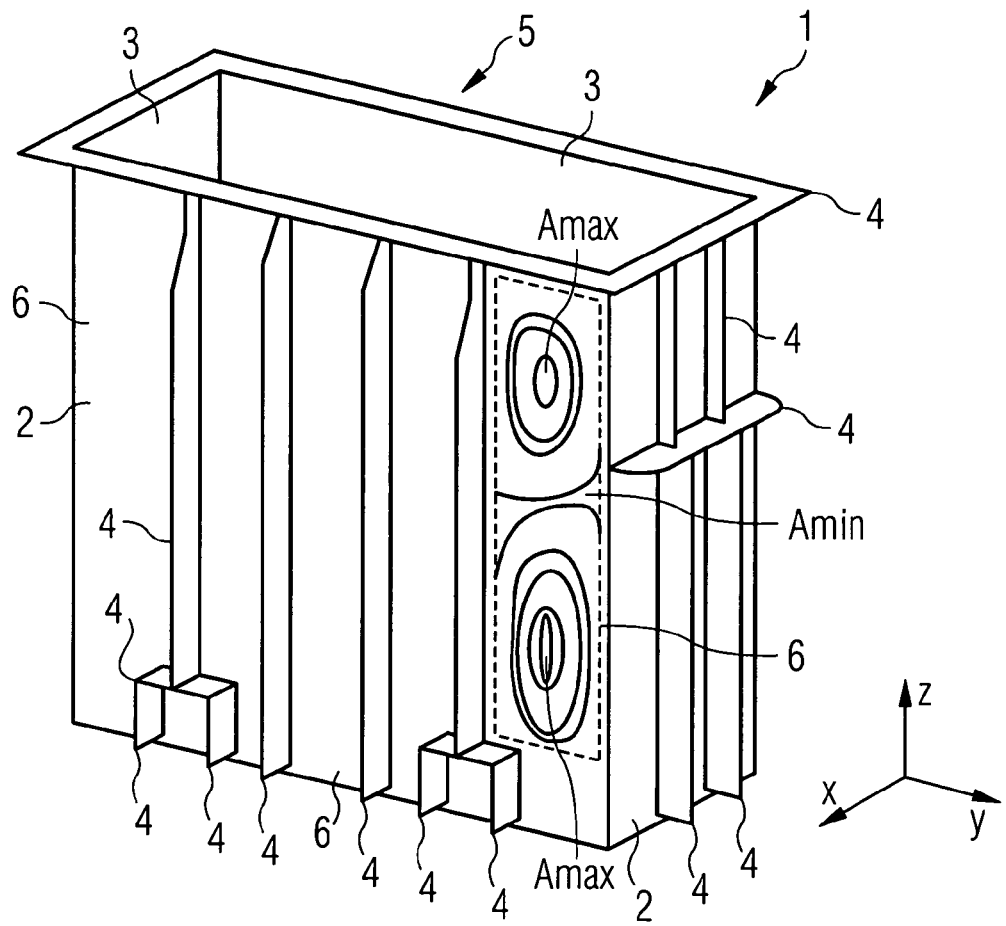
FIG. 1A shows a view at an angle of a housing with an exemplary selected distribution of a vibration amplitude.

In addition, FIG. 1A shows a housing 1 which is open at the top for accommodating an oil-filled transformer (not illustrated here) and the associated oil fill. For this purpose, the open housing 1 has five straight walls, of which in this case two side walls 2 are visible from the outside and two further side walls 3 are visible from the inside. The walls 2, 3 each have a plate-shaped basic shape, i.e. they have a small thickness in comparison with their planar extent. Outwardly directed reinforcing ribs 4 for stabilizing the walls are fitted to the outer sides of the walls 2, 3. The walls 2, 3 can therefore also in each case be considered to be an oscillatory, rib-reinforced plate. With the transformer inserted, the open upper side 5 is closed by a cover (not shown), which can likewise have reinforcing ribs. As a result of the reinforcing ribs 4, the respective side wall 2, 3 is mechanically reinforced and thus reacts with fewer vibrations to an oscillation excitation by the transformer in the vicinity of the ribs 4. In other words, the region 6 provides a low-vibration region of the housing 1 at and closely around the reinforcing ribs 4. Comparatively high vibration amplitudes are therefore formed in the non-reinforced, plate-shaped (sub)regions 6 next to the reinforcing ribs 4. In this case, these regions 6 which are more susceptible to vibrations do not need to have a higher vibration or oscillation amplitude over the entire surface than the low-vibration region at or in the vicinity of the reinforcing ribs 4; instead, it is also possible for steady-state oscillation nodes to be produced in the non-reinforced region 6, depending on the type of excitation, which oscillation nodes result in a low-oscillation region even at some distance from the reinforcing ribs 4. Edges etc. can also bring about low-oscillation regions.

In addition, the figure shows a non-reinforced region 6, which is selected by way of example and is illustrated by dashed lines, of a side wall 2 of the housing 1, which region is surrounded partially by reinforcing ribs 4 and itself does not have any such reinforcing ribs. In this region 6 illustrated by dashed lines, the level of an oscillation amplitude with excitation which is typical for a transformer is shown here purely by way of example using vertical lines. In the dashed region 6, two local oscillation amplitude maxima Amax occur, which do not need to have the same level. Between these oscillation amplitude maxima, the oscillation amplitude decreases and reaches a low-vibration region of a relative amplitude minimum Amin approximately in the center between the two amplitude maxima Amax.

Figure 1B:
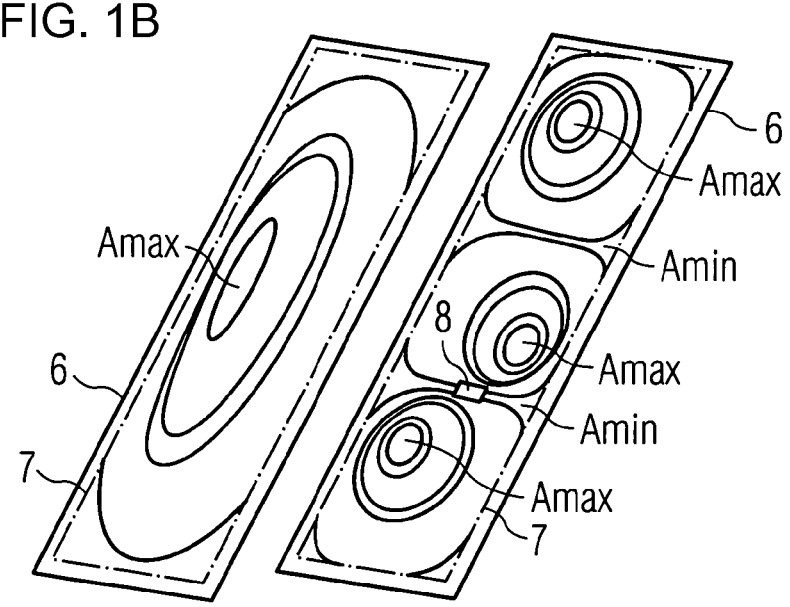
FIG. 1B shows, in two subfigures, further possible resonant vibration amplitude distributions of the selected housing section shown in FIG. 1A.

FIG. 1B shows, by way of example, the region 6 illustrated by dashed lines in FIG. 1A with two further possible oscillation amplitude distributions, which are each produced by different excitations. In the left-hand subfigure, only one vibration amplitude maximum Amax is formed in the shown region 6 of the side wall 2, with the vibration pattern in the form of a single oscillation antinode being distributed over this region.

However, as shown in the right-hand subfigure, excitation conditions are also possible in which a plurality of, in this case three, oscillation maxima Amax can be formed over the region under consideration, with the result that, similarly to the example shown in FIG. 1A, comparatively low-vibration regions with local oscillation minima Amin can also be formed between said oscillation maxima Amax, even without the provision of reinforcing ribs or other reinforcing elements such as beads, etc.

Owing to the oscillation of the housing walls, sound is emitted into the surrounding environment, and this sound is perceived as very disruptive. This sound emission can be reduced by attaching vacuum panels to the housing or to the walls thereof, as will be described in more detail further below. In order to achieve high sound damping, the vacuum panels themselves should be prevented from being excited so as to cause oscillations. The attachment of one or more vacuum panels in the region 6 illustrated by dashed lines in FIG. 1A and also shown in FIG. 1B should be performed on a low-vibration region. In each of the cases shown in FIGS. 1A and 1B, for this purpose a vacuum panel can be positioned in particular at the outer periphery of the region 6, as is indicated by a placement line 7 illustrated by dashed lines. A vacuum panel then covers one or more subregions subject to severe vibrations (in each case having a local vibration maximum), depending on the excitation. In the cases shown in FIG. 1A and FIG. 1B, right-hand subfigure, a fastening or support (bearing point) 8 of the vacuum panel can also be realized in a low-vibration subregion (in each case having a local vibration minimum). Alternatively, however, the vacuum panel can also be supported at least partially on a reinforcing element.

A vacuum panel 11 is preferably generally supported by a peripheral sealing O ring on reduced-vibration housing plate regions, for example next to rib-reinforced or bead-reinforced regions or in the region of the node lines of dominant natural oscillation modes of the housing plate regions between the reinforcing structures. Additionally required punctiform or linear bearing points can be positioned here.

Figure 2:
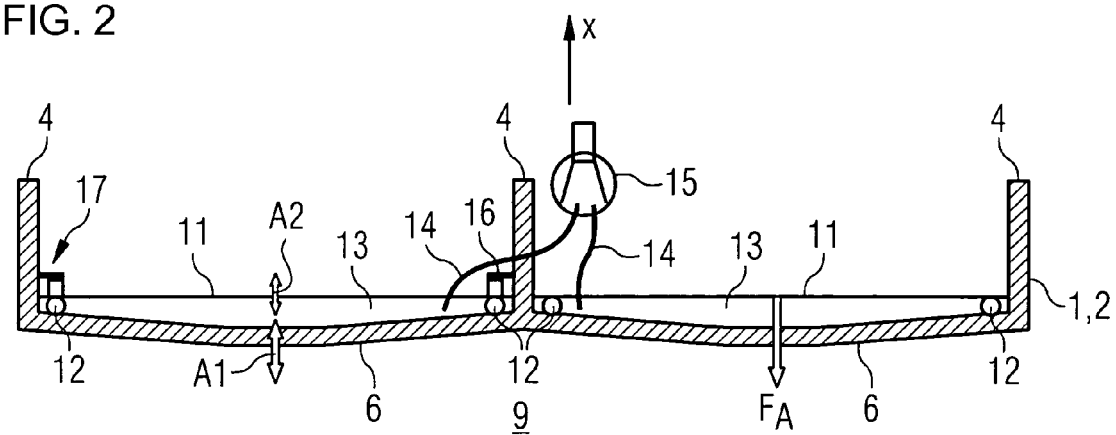
FIG. 2 shows a sectional illustration in a side view of a detail of the housing shown in FIG. 1A with vacuum panels fixed thereto.

FIG. 2 shows a detail of the side wall 2 of the housing 1 shown in FIG. 1A in the vertical direction (along the z axis), which is delimited laterally by two reinforcing ribs 4, with a further reinforcing rib 4 being provided centrally between said two reinforcing ribs. The side wall 2 is bent slightly inwards (counter to the x axis) between the reinforcing ribs 4 for absorbing loads of higher pressures in the interior 9 of the housing 1. During operation of a transformer accommodated in the housing 1, in particular an oil-filled transformer, in which the interior is filled with oil, the side wall 2 vibrates owing to transformer hum conducted through the oil. As is indicated in FIG. 1A and FIG. 1B, the wall 2 is subject to comparatively low vibrations at or in the vicinity of the reinforcing ribs 4; severe vibrations instead occur in the plate-like wall regions 6 delimited by the reinforcing ribs 4, as is indicated by way of example by the double arrow denoted by A1. The oscillations defining a generation of sound are perpendicular to the surface of the plate-like wall region 6 or approximately parallel to the surface normal thereof. Each of the two plate-like regions 6 shown which are not provided with reinforcing elements is covered in each case by means of a plate-shaped vacuum panel 11.

The plate-shaped vacuum panel 11 itself represents an oscillatory system, whose natural frequencies are determined by its geometry (thickness, length, width), physical properties (modulus of elasticity, density), the clamping situation and, in the case of pressure being applied to one side, by resultant force boundary conditions. The oscillation properties of the vacuum panel 11 can be determined, for example, by the Kirchhoff plate theory or the Timoshenko-Mindlin bending wave equation. The vacuum panel 11 is dimensioned such that there are no dominant natural modes or resonant frequencies in the frequency range to be damped. In addition, the thickness of the vacuum panel 11 is selected such that bending of the vacuum panel 11 which results in contact with the plate structure 6 therebelow is avoided by the differential pressure (ambient pressure/negative pressure in the cavity 13) depending on the field dimensions and the flexural strength.

The mass of the vacuum panels 11 for sound decoupling is also much lower than the mass of the plate structures 2, 6 to be damped which have the same area.

The respective vacuum panel 11 rests, via a negative-pressure-tight peripheral seal 12, on the region 6 located between the reinforcing ribs 4 and covers said region apart from a small gap towards the respective reinforcing rib 4. The peripheral seal 12 at the same time acts as a spacer between the plate 6 and the insulation panel 11.

By virtue of the vacuum panel 11, the housing wall 2 and the circumferential peripheral seal 12, a cavity or interspace 13 is produced between the vacuum panel 11 and the housing wall 2, which cavity or interspace is connected to a vacuum pump 15 which generates as little noise as possible via a respective vacuum line 14. In principle, the vacuum pump 15 is connected in series or in parallel to the cavities 13 to which a negative pressure is applied. During steady-state operation, the vacuum pump 15 merely needs to compensate for losses of leak rate; the design of the vacuum pump 15 can be such that it has correspondingly small dimensions. Continuous operation of the vacuum pump 15 is not necessary either if a sufficient negative pressure within a pressure regulating range is ensured by pressure regulation.

During operation of the vacuum pump 15, the vacuum panel 11 is attracted by suction or drawn to the housing wall 2 or the plate-shaped region 6 with a force $F_A$ as a result of the negative pressure produced in the cavity 13, as is indicated by the arrow. In this case, the negative pressure is preferably dimensioned such that the contact-pressure force $F_A$ keeps the vacuum panels 11 safely in the previously positioned location, counter to all static (for example gravitational force) and dynamic forces (including operating conditions), depending on the horizontal or vertical position of said vacuum panels 11. The negative pressure which is thus set in the cavity 13 therefore firstly ensures a secure fit of the vacuum panel 11 against the housing wall 2, 6 and secondly brings about a reduction in noise owing to the lower oscillation excitation of the vacuum panel 11 owing to a sound transmission from the plate-like region 6 through the cavity 13. In other words, the lower pressure in the cavity 13 reduces the coupling between the vibrating plate 6 and the vacuum panel 11 and improves the sound insulation effect.

The oscillation damping becomes even more effective by virtue of the fact that an oscillation excitation of the vacuum panel 11 as a result of a structure-borne noise transmitted via the fastening 16 to the housing 2, 6 is low since the vacuum seal 12 is comparatively soft and also the fastening of the vacuum panel 11 is not permanent. Instead, in the event of a reduction in or failure of the negative pressure, the vacuum panel 11 is released from the housing 2, 6 without any further measures.

In order to prevent the vacuum panels 11 from falling off the housing 2, 6 in the event of a desired or undesired loss of negative pressure, a punctiform negative-pressure loss holder 16 and a linear negative-pressure loss holder 17 are disclosed here by way of example, said holders catching the vacuum panels 11 in the event of a loss of negative pressure. In this case, the position and geometry of the holders structurally ensure that there is no notable transfer of vibrations to the panels via the holders during normal operation when a vacuum is applied. In the event of a pressure loss, a residual sound insulation effect as a result of sound absorption properties of the panels and the cavity arrangement per se remains.

In order that the vacuum panels 11 do not need to be pressed individually against the housing again when a negative pressure is produced again in the cavity 13, but are automatically attracted to the housing 2 again, the negative-pressure loss holder 16, 17 is also designed and arranged in such a way that it presses the vacuum panel 11 gently against the housing 1, 6, as a result of which the seal 12 retains sufficient sealtightness.

The cavity 13 to which a negative pressure is applied can also be equipped with sound-absorbing materials (not shown), for example with insulation wool and/or porous absorbers.

In an alternative configuration, for example, various cavities 13 can be fluidically connected to one another, with the result that it is not necessary for each cavity 13 to have a dedicated connection 14 to a vacuum pump 15.

Overall, much less vibration results at a vacuum panel 11 than in the region to be damped therebelow, as is indicated by the smaller double arrow A2.

Figure 3:
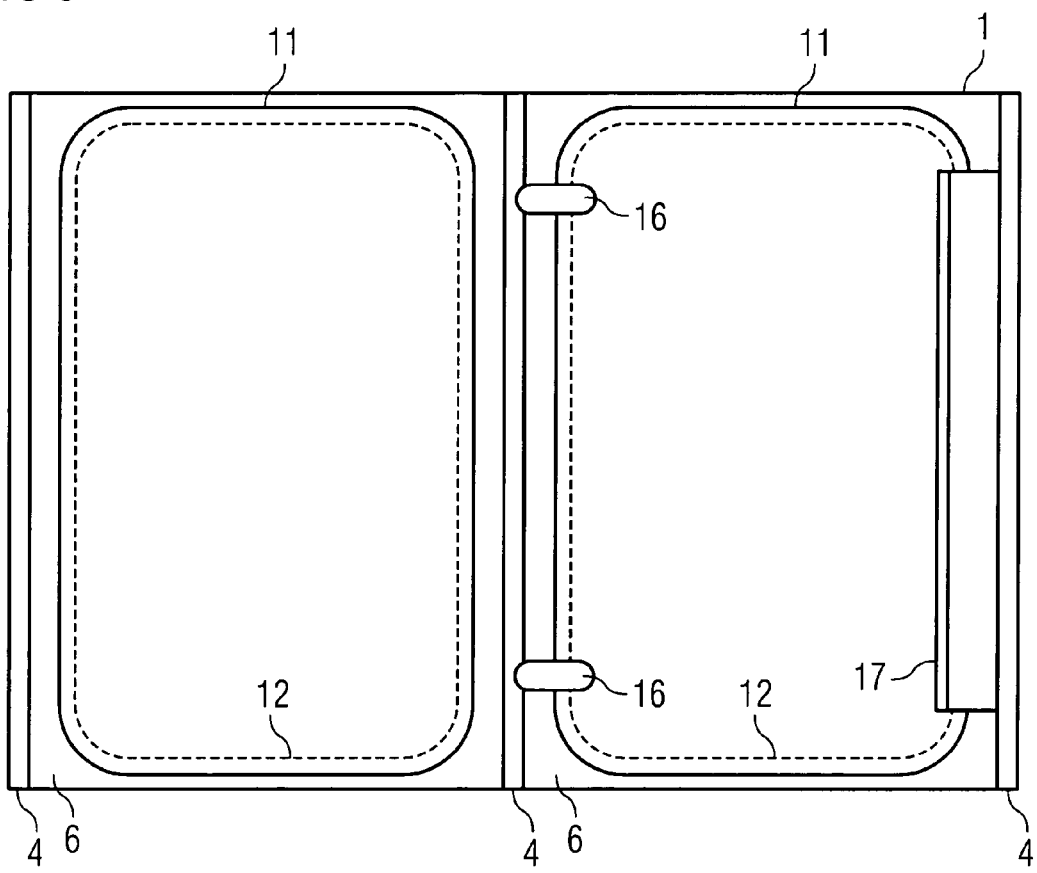
FIG. 3 shows a plan view of the detail shown in FIG. 2.

FIG. 3 shows a plan view of two housing regions 6, which are covered by a respective vacuum panel 11 or cavity 13 and are delimited laterally by straight ribs 4. The vacuum panels 11 have, in plan view, a rectangular basic shape with rounded-off edges. The negative-pressure seal 12 present in the form of a sealing edge O ring and having a position which is indicated here by dashed lines is close to the periphery and follows the shape of the periphery of the vacuum panel 11. For the right-hand vacuum panel 11, two types of negative-pressure loss holders are shown by way of example, namely the "punctiform" negative-pressure loss holder 16 described already in FIG. 2 and the "linear" negative-pressure loss holder 17.

Figure 4A:
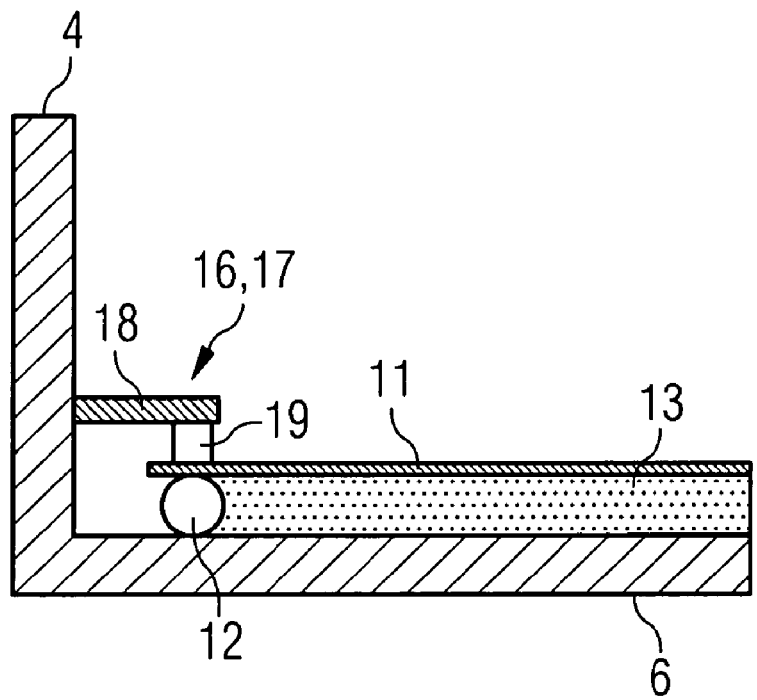
FIG. 4 shows, in two subfigures, FIG. 4A and FIG. 4B, in each case a sectional illustration in a side view of an enlarged detail of the arrangement shown in FIG. 2 at a peripheral region of a vacuum panel with different configurations of a negative-pressure loss holder.

FIG. 4A shows the negative-pressure loss holder 16 or 17 in a depiction similar to that in FIG. 2 in the region of the reinforcing rib 4. The negative-pressure loss holder 16, 17 has, in one configuration, a projection 18 made of metal which emerges laterally from the reinforcing rib 4 and extends over the vacuum panel 11. An elastic plastic element ("stopper") 19 is located fastened on the metal and directed towards the vacuum panel 11 and in a manner so as to press said vacuum panel 11 against the O ring 12.

Figure 4B:
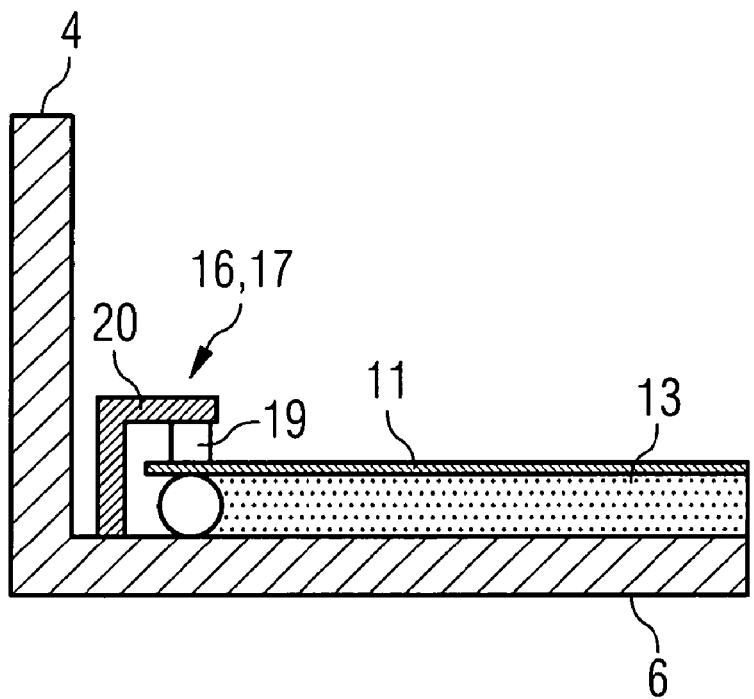

In the variant shown in FIG. 4B, the negative-pressure loss holder 16, 17 no longer emerges from the reinforcing rib 4, but from the plate-shaped wall region 6, which is delimited by the reinforcing rib 4. The negative-pressure loss holder 16, 17 therefore has a metallic holder part 20, which extends vertically, starting from the region 6, between the vacuum panel 11 and the reinforcing rib 4 in front of the vacuum panel 11 and is thereafter curved in such a way that it reaches laterally over the vacuum panel 11 from the outside. In this case too, the plastic stopper 19 is provided on the metallic holder part 20. In the event of a loss of negative pressure, the vacuum panel 11 presses harder against the stopper and thus increases the distance from the plate region 6. However, the vacuum panel 11 is not lifted off from the seal 12, but merely relieves the stress on said seal 12, with the result that a negative pressure can build up again thereafter, which negative pressure draws the vacuum panel 11 automatically against the plate region 6.

Figure 5A:
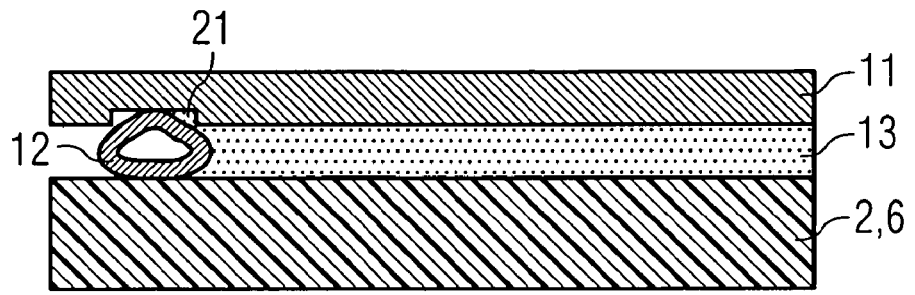
FIG. 5 shows, in two subfigures, FIG. 5A and FIG. 5B, in each case a sectional illustration in a side view of an enlarged detail of the arrangement shown in FIG. 2 at a peripheral region of a vacuum panel with different configurations of the vacuum panel.

FIG. 5A shows the arrangement of the wall region 6, the seal 12, the vacuum panel 11 and the cavity 13 on a peripheral region of the vacuum panel 11 in a further detailed illustration, wherein the negative-pressure-proof sealing ring 12 is in the form of a hose-like seal. In order to physically fix the seal 12, the vacuum panel 11 has an accommodating groove 21 for partially accommodating the seal 12 on its side directed towards the housing 2. In an alternative configuration, the receptacle 21 can also be provided in the housing 2, or both in the housing 2 and in the vacuum panel 11.

Figure 5B:
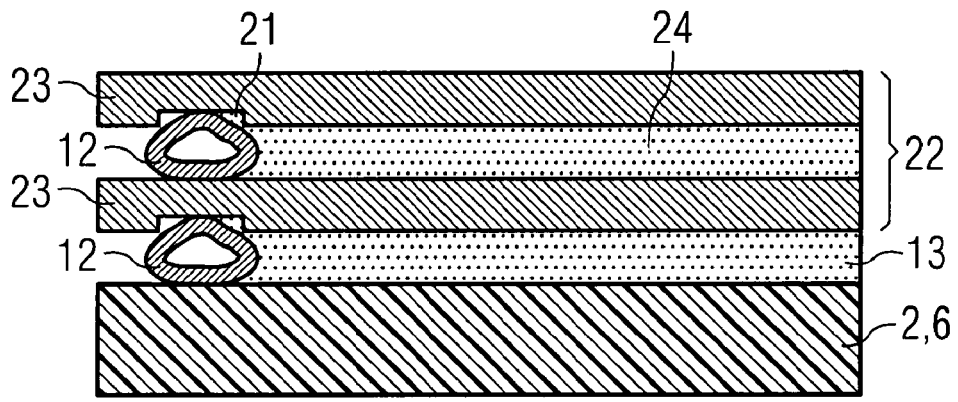

FIG. 5B shows a further embodiment of the vacuum panel 22, which now has a multilayered design (in the form of a sandwich structure) with a plurality of vacuum chambers 24 which are dependent on one another or insulated from one another. In this case, two panel layers (support layers) 23 which are spaced apart from one another are now separated from one another by a cavity 24, to which a negative pressure is applied, wherein the cavity 24 is sealed off on the other side by a further vacuum seal 12. In this case, the negative pressure in the cavity 24 of the vacuum panel 22 can be produced by a dedicated fluid line to a vacuum pump or, for example, by virtue of the fact that the cavity 24 is fluidically connected to the cavity 13, to which a negative pressure can be applied, between the negative-pressure panel 22 and the housing 2, for example by means of one or more leadthroughs. This embodiment can also be referred to as a "double vacuum panel" since it can in principle also be described as an arrangement of two vacuum panels or panel layers 23 stacked one on top of the other. It is of course possible for the type and shape of the panels 23 to differ from the type and shape of the panels 11 shown in FIGS. 1 to 5A. It is also possible for more than two panel layers or panels to be arranged one above the other in order thus to produce an n-layered vacuum panel with improved noise insulation, where $n \geq 3$.

If sheet steel or aluminum is used for the vacuum panels or panel layers, these materials do not demonstrate any notable inner damping; structure-borne noise can propagate virtually unimpeded in the plate and be emitted over a large area as airborne noise. In order to increase the damping of the panels, at least one damping sound absorber layer, for example a plastic lining, can be applied to the panel (two-layered composite sheet) or an absorber layer, in particular damping plastic layer, can be introduced between two cover sheets (three-layered composite sheet), for example at least on one side. The damping effect of such and similar composite sheets consists in that the pulsating deformations are forced upon the damping plastic layer in the event of bending oscillations of the sheet, as a result of which oscillation energy is absorbed there owing to inner friction.

Figure 6:
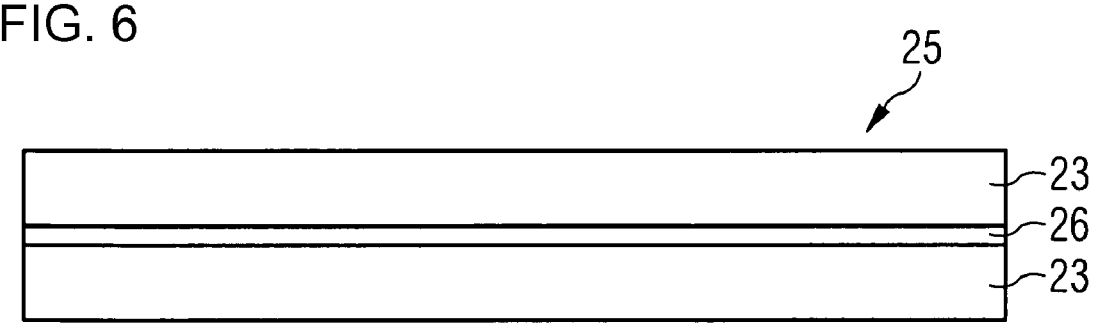
FIG. 6 shows a sectional illustration in a side view of a further possible configuration of the vacuum panel.

FIG. 6 shows, in this regard, a possible further embodiment of a vacuum panel 25 with a three-layered embodiment, wherein there is now no cavity between two metallic support layers 23 of the vacuum panel 25, but a sound-absorbing interlayer 26. For particularly effective dissipation of vibration energy into heat, the interlayer 26 has a viscoelastic plastic. In the exemplary embodiment shown here, the thickness of the plastic interlayer 26 is between 25 µm and 50 µm.

In principle, it is possible for even more alternate interlayers 26 and cover layers 23 to be provided, for example two viscoelastic interlayers 26 which are inserted between three metallic panel layers 23, or more generally n sound-absorbing interlayers 26, in particular viscoelastic interlayers, which are introduced between n+1 metallic panel layers (support layers) 23, or else alternately n absorber layers and n support layers, or else n support layers which are introduced between n+1 sound-absorbing interlayers 26.

Instead of metallic support layers, support layers with or consisting of plastic and/or ceramic can also be used.

These vacuum panels 25 can be used instead of the vacuum panels 22 shown in FIG. 5B or else instead of only one panel layer 23 shown in FIG. 5B.

The present invention is of course not restricted to the exemplary embodiments described.

Thus, the plate structure to be damped can generally be provided on one side with a dense fluid (for example with oil in the case of a housing for an oil-filled transformer or water in the case of a tank structure), or else not.

The vacuum panels can be arranged on the front and/or rear side of a plate structure to be damped.

The vacuum panels can be fitted retrospectively to already existing reinforced plate structures.

The device is not restricted to a transformer housing, but can also be in the form of a housing for motors etc., for example.

LIST OF REFERENCE SYMBOLS

1 Housing
2 Side wall
3 Side wall
4 Reinforcing rib
5 Open upper side
6 Wall regions susceptible to vibrations
7 Placement line
8 Support
9
10
11 Vacuum panel
12 Peripheral seal
13 Cavity
14 Vacuum line
15 Vacuum pump
16 Negative-pressure loss holder
17 Negative-pressure loss holder
18 Projection
19 Stopper
20 Holder part
21 Receptacle
22 Vacuum panel
23 Panel layer
24 Cavity
25 Vacuum panel
26 Deformable interlayer
Amax Vibration amplitude maximum
Amin Vibration amplitude minimum
$F_A$ Contact-pressure force

The invention claimed is:

1. A housing of a transformer, comprising: a plurality of regions including at least one low-vibration region of the housing to be damped, and at least one vacuum panel covering said low-vibration region of the housing at least partially.

2. The housing according to claim 1, wherein said at least one vacuum panel is fastened on said region to be damped by way of at least one cavity formed between said region to be damped and said vacuum panel, said cavity being subjected to vacuum pressure.

3. The housing according to claim 1, wherein said at least one region to be damped is, at least partly, plate-shaped or shell-shaped, and is covered by said vacuum panel.

4. The housing according to claim 1, which comprises a reinforcing element adjoining said region to be damped, and said vacuum panel is fitted on or close to said reinforcing element.

5. The housing according to claim 1, which further comprises one or more negative pressure drop securing means for holding said at least one vacuum panel in an event that the vacuum between said vacuum panel and the device becomes too low non-existent.

6. The housing according to claim 1, which further comprises sound-absorbing material disposed in a cavity formed between said region to be damped and said at least one vacuum panel.

7. The housing according to claim 1, wherein said vacuum panel is a multilayered panel.

8. The housing according to claim 7, wherein at least one layer of said panel comprises an absorber material.

9. The housing according to claim 8, wherein said at least one layer is formed of viscoelastic plastic.

10. The housing according to claim 7, wherein at least two layers of said panel form a cavity therebetween, and a negative pressure is applied to said cavity at least during normal operation of the device.

11. The housing according to claim 1, wherein said at least one vacuum panel is one of a plurality of vacuum panels disposed on an outside of the device on said region to be damped.

12. The housing according to claim 1, wherein said at least one vacuum panel is one of a plurality of vacuum panels disposed on both sides of said region to be damped.

13. The housing according to claim 1, wherein said housing is a housing of an oil-filled transformer.

14. A noise-reduction method, which comprises adhering a vacuum panel against a region to be damped by vacuum pressure such that a cavity, which is subject to the vacuum, is formed between the vacuum panel and the region to be damped.

15. A housing of a transformer, comprising:
housing walls subject to structural vibrations excited by the transformer, said walls having at least one low-vibration region; and
at least one vacuum panel covering said low-vibration region at least partially for reducing audible noise generated by the structural vibrations.

* * * * *